United States Patent [19]

Suzuki

[11] Patent Number: 5,604,722
[45] Date of Patent: Feb. 18, 1997

[54] ACCESS CONTROL METHOD AND DEVICE OF DISK UNIT

[75] Inventor: Haruyuki Suzuki, Yokohama, Japan

[73] Assignee: Ricoh Company, Ltd., Tokyo, Japan

[21] Appl. No.: 517,990

[22] Filed: Aug. 22, 1995

Related U.S. Application Data

[63] Continuation of Ser. No. 303,144, Sep. 8, 1994, abandoned, which is a continuation of Ser. No. 990,450, Dec. 15, 1992, abandoned.

[30] Foreign Application Priority Data

Dec. 20, 1991 [JP] Japan ................................. 3-354295

[51] Int. Cl.$^6$ ........................................... G11B 7/00
[52] U.S. Cl. .................... 369/44.28; 369/44.27; 369/32
[58] Field of Search .................... 369/44.27–44.29, 369/44.32, 32, 48; 360/78.06, 78.05

[56] References Cited

U.S. PATENT DOCUMENTS

| | | | |
|---|---|---|---|
| 4,736,353 | 4/1988 | Kasai et al. | 369/44.29 |
| 5,003,524 | 3/1991 | Ikeda | 369/44.28 |
| 5,048,001 | 9/1991 | Moriya et al. | 369/44.32 |
| 5,090,001 | 2/1992 | Ito et al. | 369/44.28 |
| 5,117,410 | 5/1992 | Akiyama | 369/44.32 |
| 5,182,736 | 1/1993 | Yanagi | 369/44.28 |
| 5,195,067 | 3/1993 | Yanagi | 369/44.28 |
| 5,220,547 | 6/1993 | Yasukawa et al. | 369/44.28 |
| 5,301,174 | 4/1994 | Matoba et al. | 369/44.32 |
| 5,335,214 | 8/1994 | Matoba et al. | 369/44.28 |
| 5,339,299 | 8/1994 | Kagami et al. | 369/44.28 |
| 5,351,222 | 9/1994 | Ikeda et al. | 369/44.28 |

FOREIGN PATENT DOCUMENTS 233731 2/1990 Japan ............................. G11B 7/085

*Primary Examiner*—Nabil Hindi
*Attorney, Agent, or Firm*—Cooper & Dunham LLP

[57] ABSTRACT

In an access control method, a light spot is formed on a disk and a track-crossing signal is detected from light reflected on the disk when the light spot crosses a track of the disk. A moving speed of the light spot is controlled by using the detected track-crossing signal to access the light spot in a radial direction of the disk in accelerating and decelerating modes. The access control method uses a precise driving device for slightly displacing the light spot in the radial direction of the disk, and a coarse driving device for greatly moving the light spot in the radial direction of the disk. The access control method has the steps of accelerating the light spot by the coarse driving device with approximately maximum ability in the accelerating mode; controlling the moving speed of the light spot by the precise driving device using the track-crossing signal in the decelerating mode; and decelerating the light spot by controlling an operation of the coarse driving device in cooperation with the precise driving device in the decelerating mode. An access controller has the coarse and precise driving devices.

2 Claims, 4 Drawing Sheets

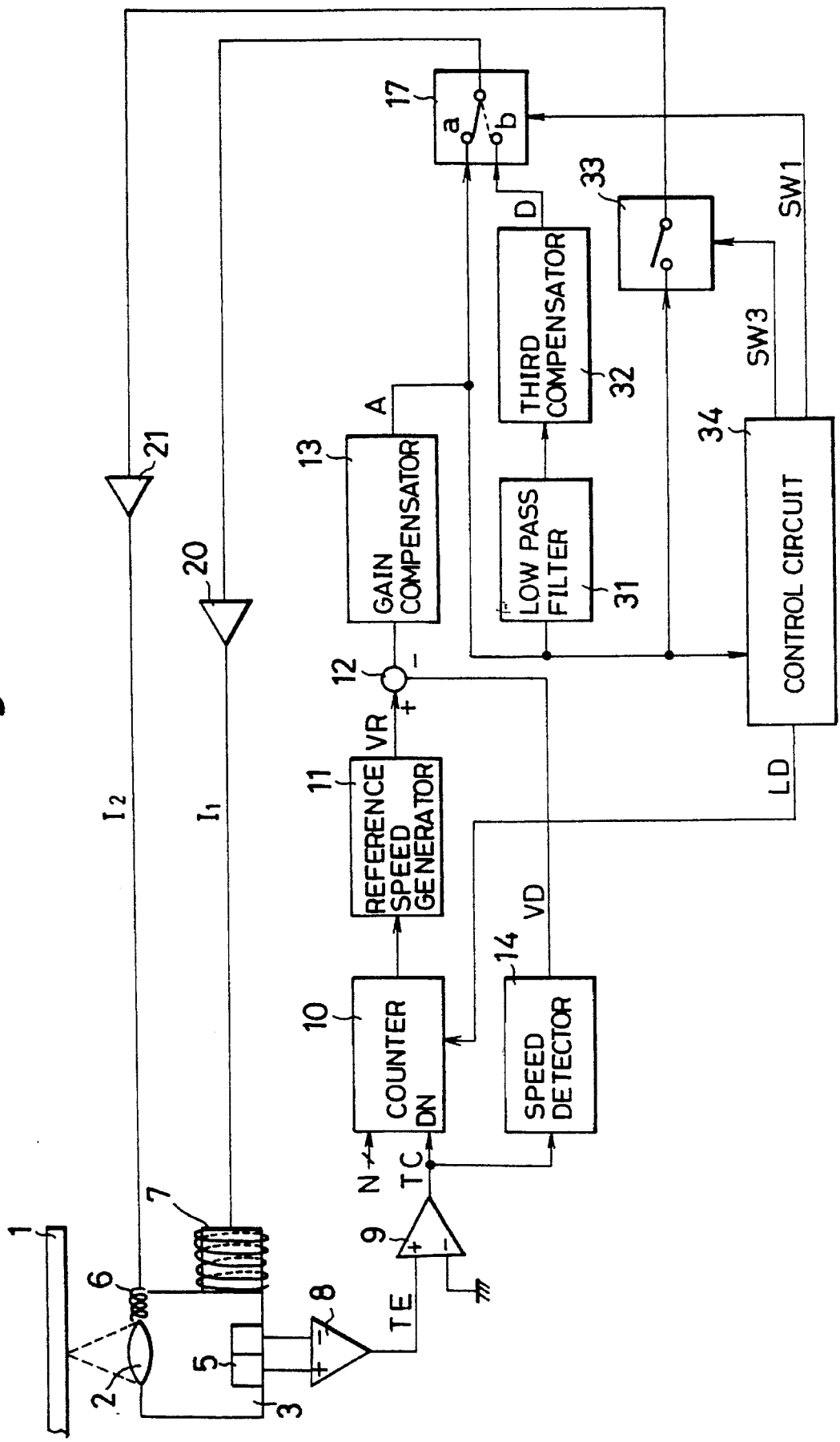

ACCESS CONTROL METHOD AND DEVICE OF DISK UNIT

This is a continuation of application Ser. No. 08/303,144 filed Sep. 8, 1994, which in turn is a continuation of application Ser. No. 07/990,450 filed Dec. 15, 1992 both abandoned.

BACKGROUND OF THE INVENTION

1. Field of the Invention

The present invention relates to access control method and device of a light spot in an optical disk drive unit. More particularly, the present invention relates to access control method and device of a disk drive unit in which a light spot can be accessed at a high speed and can be accurately positioned onto a target track.

2. Description of the Related Art

In a general well-known access method, a light spot is formed on a disk and a track-crossing signal is detected when light of the spot reflected on the disk crosses a track of the disk A moving speed of the light spot is controlled by using this track-crossing signal such that the light spot is accessed in a radial direction of the disk in accelerating and decelerating modes.

For example, Japanese Patent Application Laying Open (KOKAI) No. 2-33731 shows an optical disk drive unit having a seek motor for moving an optical head and a tracking driving means for slightly displacing a light spot. In this optical disk drive unit, a moving speed of the light spot is controlled by the tracking driving means using a tracking pulse obtained from light of the spot reflected on the disk when the light spot crosses a track of the disk. An operation of the seek motor is controlled such that the operation of the seek motor follows a movement of the tracking driving means, thereby performing an accessing operation of the light spot.

In this optical disk drive unit, a reference speed compared with the moving speed of the light spot is slowly increased from beginning of the accessing operation and is slowly decreased in the course of the accessing operation. Accordingly, no movement of the tracking driving means is excessively accelerated so that the operation of the seek motor easily follows the movement of the tracking driving means.

The reference speed must be changed at an acceleration considerably smaller than an allowable maximum acceleration of the seek motor to make the operation of the seek motor follow the movement of the tracking driving means.

This is because no operation of the seek motor can follow the movement of the tracking driving means when there are disturbances such as vibrations and eccentricity of tracks, etc.

As a result, the light spot can be accelerated only at an acceleration considerably smaller than a maximum limit of accelerating ability of the light spot, thereby increasing access time.

Accordingly, the general access control method and device have disadvantages that no light spot can be accessed at a high speed.

SUMMARY OF THE INVENTION

It is therefore an object of the present invention to provide access control method and device of an optical disk drive unit in which a light spot can be easily accessed at a high speed and a positioning operation of the light spot can be precisely controlled.

In accordance with a first structure of the present invention, the above object can be achieved by an access control method in which a light spot is formed on a disk and a track-crossing signal is detected from light reflected on the disk when the light spot crosses a track of the disk, and a moving speed of the light spot is controlled by using the detected track-crossing signal to access the light spot in a radial direction of the disk in accelerating and decelerating modes. The access control method uses precise driving means for slightly displacing the light spot in the radial direction of the disk, and coarse driving means for greatly moving the light spot in the radial direction of the disk. The access control method comprises the steps of accelerating the light spot by the coarse driving means with approximately maximum ability in the accelerating mode; controlling the moving speed of the light spot by the precise driving means using the track-crossing signal in the decelerating mode; and decelerating the light spot by controlling an operation of the coarse driving means in cooperation with the precise driving means in the decelerating mode.

In accordance with a second structure of the present invention, the above object can be achieved by an access controller in which a light spot is formed on a disk and a track-crossing signal is detected from light reflected on the disk when the light spot crosses a track of the disk, and a moving speed of the light spot is controlled by using the detected track-crossing signal to access the light spot in a radial direction of the disk in accelerating and decelerating modes. The access controller comprises precise driving means for slightly displacing the light spot in the radial direction of the disk; coarse driving means capable of greatly moving the light spot in the radial direction of the disk; relative position detecting means for outputting a position signal according to a difference between a displacing amount of the light spot provided by the precise driving means and a displacing amount of the light spot provided by the coarse driving means; counting means for outputting an error in position of the light spot according to a difference between the present position of the light spot and a target position of the light spot in accordance with the track-crossing signal; reference speed generating means for outputting a reference speed signal indicative of a reference speed monotonously reduced in accordance with a reduction in the position error of the counting means; speed detecting means for outputting a relative speed signal indicative of a relative speed between the light spot and the track in accordance with the track-crossing signal; and comparing means for outputting a speed error signal according to a difference between the reference speed and the relative speed. The access controller is constructed such that the coarse driving means is approximately operated with maximum ability in an access starting operation; and the precise driving means is operated in accordance with the speed error signal from the comparing means and the coarse driving means is operated in accordance with the position signal from the relative position detecting means after it is detected that the speed error signal from the comparing means shows a value equal to or smaller than a predetermined value.

In accordance with a third structure of the present invention, an absolute value shown by the position signal in the access controller having the above second structure is reduced by operating the precise driving means in accordance with the position signal from the relative position detecting means while the coarse driving means is approximately operated with maximum ability.

In accordance with a fourth structure of the present invention, the above object can be achieved by an access controller in which a light spot is formed on a disk and a track-crossing signal is detected from light reflected on the disk when the light spot crosses a track of the disk, and a moving speed of the light spot is controlled by using the detected track-crossing signal to access the light spot in a radial direction of the disk in accelerating and decelerating modes. The access controller comprises precise driving means for slightly displacing the light spot in the radial direction of the disk; coarse driving means capable of greatly moving the light spot in the radial direction of the disk; relative position detecting means for outputting a position signal according to a difference between a displacing amount of the light spot provided by the precise driving means and a displacing amount of the light spot provided by the coarse driving means; counting means for outputting an error in position of the light spot according to a difference between the present position of the light spot and a target position of the light spot in accordance with the track-crossing signal; reference speed generating means for outputting a reference speed signal indicative of a reference speed monotonously reduced in accordance with a reduction in the position error of the counting means; speed detecting means for outputting a relative speed signal indicative of a relative speed between the light spot and the track in accordance with the track-crossing signal; and comparing means for outputting a speed error signal according to a difference between the reference speed and the relative speed. The access controller is constructed such that the coarse driving means is operated in accordance with the speed error signal from the comparing means in an access starting operation; and the precise driving means is operated in accordance with the speed error signal from the comparing means and the coarse driving means is operated in accordance with the position signal from the relative position detecting means after it is detected that the speed error signal from the comparing means shows a value equal to or smaller than a predetermined value.

In accordance with a fifth structure of the present invention, an absolute value shown by the position signal in the access controller having the above fourth structure is reduced by operating the precise driving means in accordance with the position signal from the relative position detecting means while the coarse driving means is operated in accordance with the speed error signal.

In accordance with a sixth structure of the present invention, the above object can be achieved by an access controller in which a light spot is formed on a disk and a track-crossing signal is detected from light reflected on the disk when the light spot crosses a track of the disk, and a moving speed of the light spot is controlled by using the detected track-crossing signal to access the light spot in a radial direction of the disk in accelerating and decelerating modes. The access controller comprises precise driving means for slightly displacing the light spot in the radial direction of the disk; coarse driving means capable of greatly moving the light spot in the radial direction of the disk; counting means for outputting an error in position of the light spot according to a difference between the present position of the light spot and a target position of the light spot in accordance with the track-crossing signal; reference speed generating means for outputting a reference speed signal indicative of a reference speed monotonously reduced in accordance with a reduction in the position error of the counting means; speed detecting means for outputting a relative speed signal indicative of a relative speed between the light spot and the track in accordance with the track-crossing signal; and comparing means for outputting a speed error signal according to a difference between the reference speed and the relative speed. The access controller is constructed such that the coarse driving means is approximately operated with maximum ability in an access starting operation; and the precise driving means is operated in accordance with the speed error signal from the comparing means and the coarse driving means is operated in accordance with a low frequency region component of the speed error signal from the comparing means after it is detected that the speed error signal from the comparing means shows a value equal to or smaller than a predetermined value.

In the present invention, the light spot is accelerated by the coarse driving means with approximately maximum ability in the accelerating mode. The moving speed of the light spot is controlled by the precise driving means using the track-crossing signal in the decelerating mode. The light spot is decelerated by controlling an operation of the coarse driving means in cooperation with the precise driving means in the decelerating mode. Accordingly, it is possible to reduce an access time of the light spot.

Simultaneously, the moving speed of the light spot can be precisely controlled in cooperation with control operations of the coarse and precise driving means at a decelerating time of the access controller so that the light spot can be exactly positioned onto a target track. These operations and effects can be commonly obtained in the first to sixth structures of the present invention.

Further objects and advantages of the present invention will be apparent from the following description of the preferred embodiments of the present invention as illustrated in the accompanying drawings.

BRIEF DESCRIPTION OF THE DRAWINGS

FIG. 5 is a functional block diagram showing the construction of a main portion of an access controller in a disk drive unit in accordance with a second embodiment of the present invention.

DESCRIPTION OF THE PREFERRED EMBODIMENTS

The preferred embodiments of access control method and device of a disk unit in the present invention will next be described in detail with reference to the accompanying drawings.

The following first embodiment mainly corresponds to first to fifth structures of the present invention.

Figure 1:
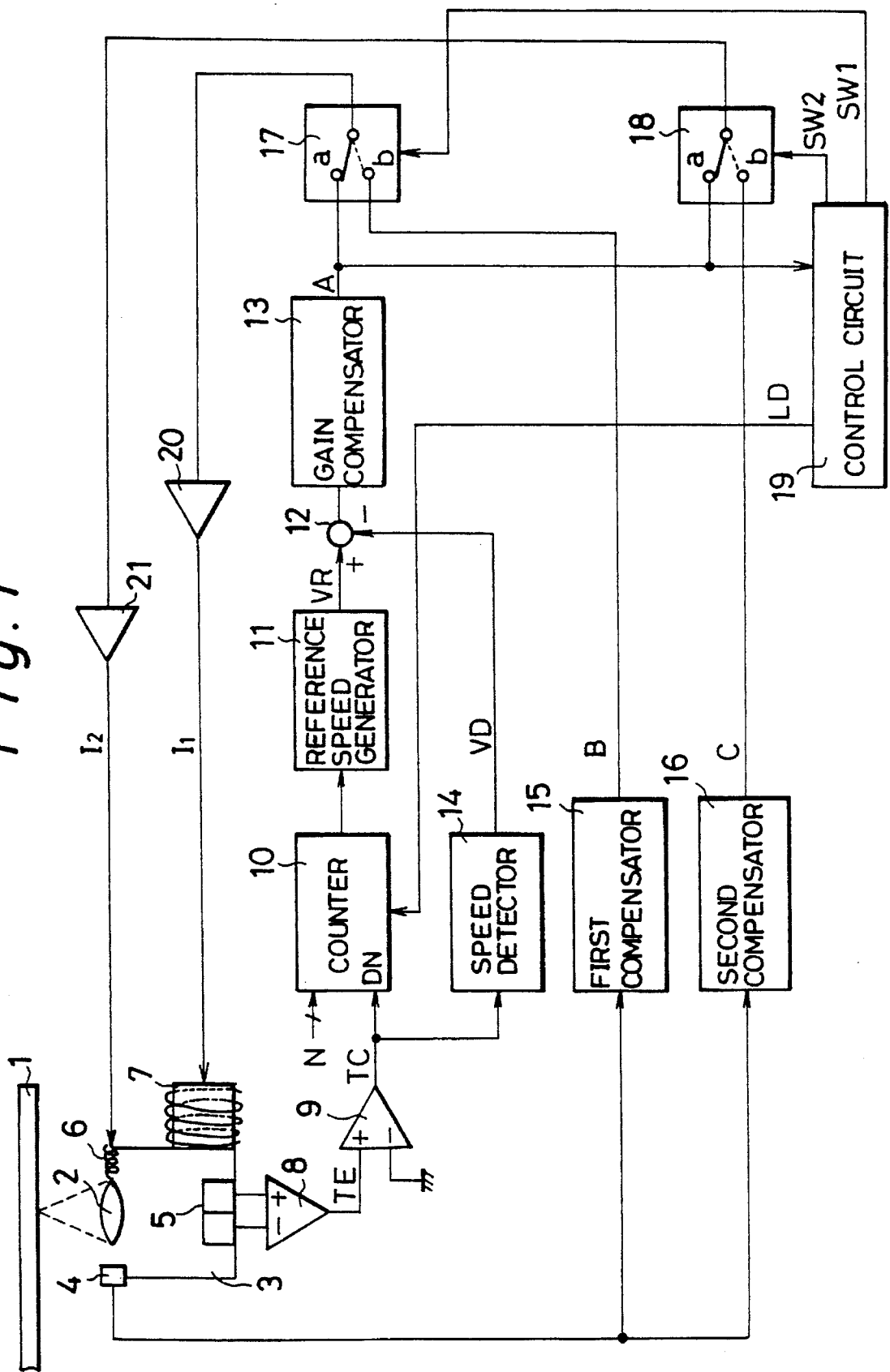
FIG. 1 is a functional block diagram showing the construction of a main portion of an access controller in a disk drive unit in accordance with a first embodiment of the present invention.

FIG. 1 is a functional block diagram showing the construction of a main portion of an access controller in a disk drive unit in accordance with the first embodiment of the present invention. In FIG. 1, reference numerals 1, 2, 3 and 4 respectively designate a disk, an objective lens, an optical head and a lens position sensor. Reference numerals 5, 6, 7 and 8 respectively designate a two-divisional light sensor, an actuator, a seek motor and a differential amplifier. Reference numerals 9, 10, 11 and 12 respectively designate a comparator, a counter, a reference speed generator and a subtracter. Reference numerals 13, 14, 15 and 16 respectively designate a gain compensator, a speed detector, a first compensator and a second compensator. Reference numerals 17, 18, 19, 20 and 21 respectively designate a first switch, a second switch, a control circuit, a first power amplifier and a second power amplifier. Reference numerals TE, TC and N respectively designate a track-crossing signal, a track-crossing pulse and an initial counting value of the counter 10. Reference numerals VR, VD and A respectively designate a reference speed, a moving speed and an output signal of the gain compensator 13 as a lens moving signal. Reference numerals B, C and LD respectively designate an output signal of the first compensator 15, an output signal of the second compensator 16 and a loading pulse. Reference numerals SW1 and SW2 respectively designate a switching control signal of the first switch 17 and a switching control signal of the second switch 18. Reference numerals $I_1$ and $I_2$ respectively designate an output electric current of the first power amplifier 20 and an output electric current of the second power amplifier 21.

An operation of the access controller of the present invention shown in FIG. 1 will first be explained with respect to a portion common to the operation of the general access controller.

The objective lens 2 forms a light spot on the disk 1 and can be slightly displaced by the actuator 6 in a radial direction of the disk 1.

The optical head 3 is similarly constructed such that the optical head 3 can be greatly moved by the seek motor 7 in the radial direction of the disk 1.

The lens position sensor 4 has a function for detecting a displacing amount of the objective lens 2 with respect to the optical head 3.

When the light spot crosses a track of the disk 1, a track-crossing signal TE is detected by the two-divisional light sensor 5 and the differential amplifier 8.

A waveform of this track-crossing signal TE is shaped by the comparator 9 so that this track-crossing signal TE is two-valued and is outputted from the comparator 9 to the counter 10 as a track-crossing pulse TC.

The counter 10 is counted down in accordance with the track-crossing pulse TC outputted from the comparator 9.

An initial counting value N is loaded to this counter 10 by a loading pulse LD outputted from the control circuit 19.

A counting value of this counter 10 is outputted to the reference speed generator 11 at the next stage. The reference speed generator 11 outputs a reference speed VR for moving the light spot.

The above construction and operation of the access controller are basically similar to those in the general disk drive unit.

The corresponding relation between the second structure of the present invention and the construction of the access controller shown in FIG. 1 will next be explained.

The actuator 6 shown in FIG. 1 constitutes a precise driving means for slightly displacing the light spot in the radial direction of the disk.

The seek motor 7 shown in FIG. 1 constitutes a coarse driving means for greatly moving the light spot in the radial direction of the disk.

The lens position sensor 4 shown in FIG. 1 constitutes a relative position detecting means for outputting a position signal according to a difference between a displacing amount of the light spot displaced by the precise driving means and a displacing amount of the light spot displaced by the coarse driving means.

The comparator 9 and the counter 10 shown in FIG. 1 constitute a counting means for outputting an error in position according to a difference between the present position of the light spot and a target position thereof in accordance with the track-crossing signal.

The reference speed generator 11 shown in FIG. 1 constitutes a reference speed generating means for outputting a reference speed signal indicative of a reference speed monotonously reduced in accordance with a reduction in the position error of the counting means.

The speed detector 14 shown in FIG. 1 constitutes a speed detecting means for outputting a relative speed signal indicative of a relative speed between the light spot and a track in accordance with the track-crossing signal.

The subtracter 12 shown in FIG. 1 constitutes a comparing means for outputting a speed error signal according to a difference between the reference speed and the relative speed.

When an accessing operation of the light spot is started, the coarse driving means is approximately operated with maximum ability and it is detected that a voltage of the speed error signal from the comparing means is reduced and equal to or smaller than a predetermined value. Thereafter, the precise driving means is operated in accordance with the speed error signal from the comparing means. Further, the coarse driving means is operated in accordance with the position signal from the relative position detecting means. These operations are mainly performed by the first switch 17, the second switch 18 and the control circuit 19 shown in FIG. 1 and are supplementarily performed by the first compensator 15 and the second compensator 16.

The next explanation relates to the relation between the counting value outputted from the counter 10 and a value of the reference speed outputted from the reference speed generator 11 in the access controller shown in FIG. 1.

Figure 2:
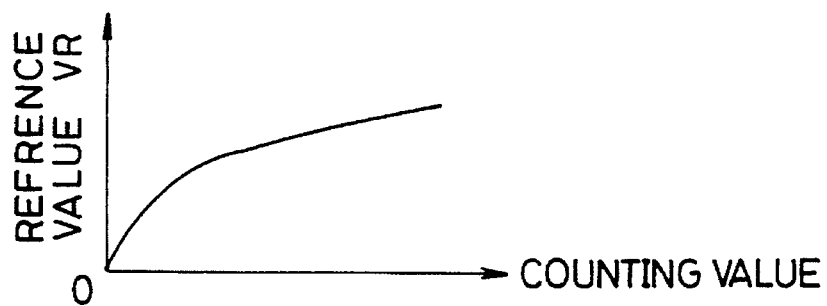
FIG. 2 is a graph showing one characteristic example of the relation between the counting value of a counter 10 and a reference speed value of a reference speed generator 11 in access control method and device of the present invention.

FIG. 2 is a graph showing one characteristic example of the relation between the counting value of the counter 10 and the reference speed value of the reference speed generator 11 in the access control method and device of the present invention. In FIG. 2, axes of abscissa and ordinate respectively show the counting value and the reference speed value.

As shown in FIG. 2, in the access control method and device of the present invention, the reference speed value (reference speed VR) and the counting value are set in a relation in which the reference speed value is monotonously increased as the counting value is increased. For example, the reference speed value is set to be proportional to a square root of the counting value.

An initial counting value N of the counter 10 is set in accordance with the number of tracks to be accessed. The counter 10 performs a subtracting operation every time the track-crossing pulse TC is inputted to the counter 10. Accordingly, an output of the counter 10 is sequentially reduced in number from this initial counting value N so that this output is provided in the order of N, N-1, N-2, N-3, - - -.

Accordingly, a first value of the reference speed VR is maximum and the reference speed value is then reduced every time the light spot crosses a track.

On the one hand, the track-crossing pulse TC outputted from the comparator 9 is inputted to the counter 10 so that the counter 10 counts down. On the other hand, this track-crossing pulse TC is inputted to the speed detector 14 and is used to detect a moving speed VD of the light spot.

For example, the speed detector 14 may be constructed by using a well-known frequency/voltage (F/V) converter. Otherwise, the speed detector 14 may be constructed by a circuit for detecting a period of the track-crossing pulse TC and having a function for calculating an inverse number of this pulse period.

The moving speed VD of the light spot detected by this speed detector 14 is compared with the above-mentioned reference speed VR by the subtracter 12 at the next stage.

Concretely, the subtracter 12 calculates a difference between the reference speed VR and the moving speed Vd, i.e., (VR−VD). The calculated results of the subtracter 12 as compared results are amplified by the gain compensator 13 as a gain element so that a lens moving signal A is obtained as an output signal.

An output of the lens position sensor 4 shows a displacing amount of the objective lens 2 with respect to the optical head 3. This output of the lens position sensor 4 is outputted to the first compensator 15 and the second compensator 16 to suitably compensate phases with respect to this output. Thus, an output signal B of the first compensator 15 and an output signal C of the second compensator 16 are obtained.

As already described, the control circuit 19 loads the initial counting value N to the counter 10 by the loading pulse LD. Further, the control circuit 19 outputs a switching control signal SW1 to the first switch 17 and a switching control signal SW2 to the second switch 18 such that the first switch 17 is switched on an input side a and the second switch 18 is switched on an input side b.

Accordingly, the first switch 17 outputs the output signal A of the gain compensator 13 as a lens moving signal so that SW1 shows A. The second switch 18 outputs the output signal C of the second compensator 16 so that SW2 shows C.

Figure 3:
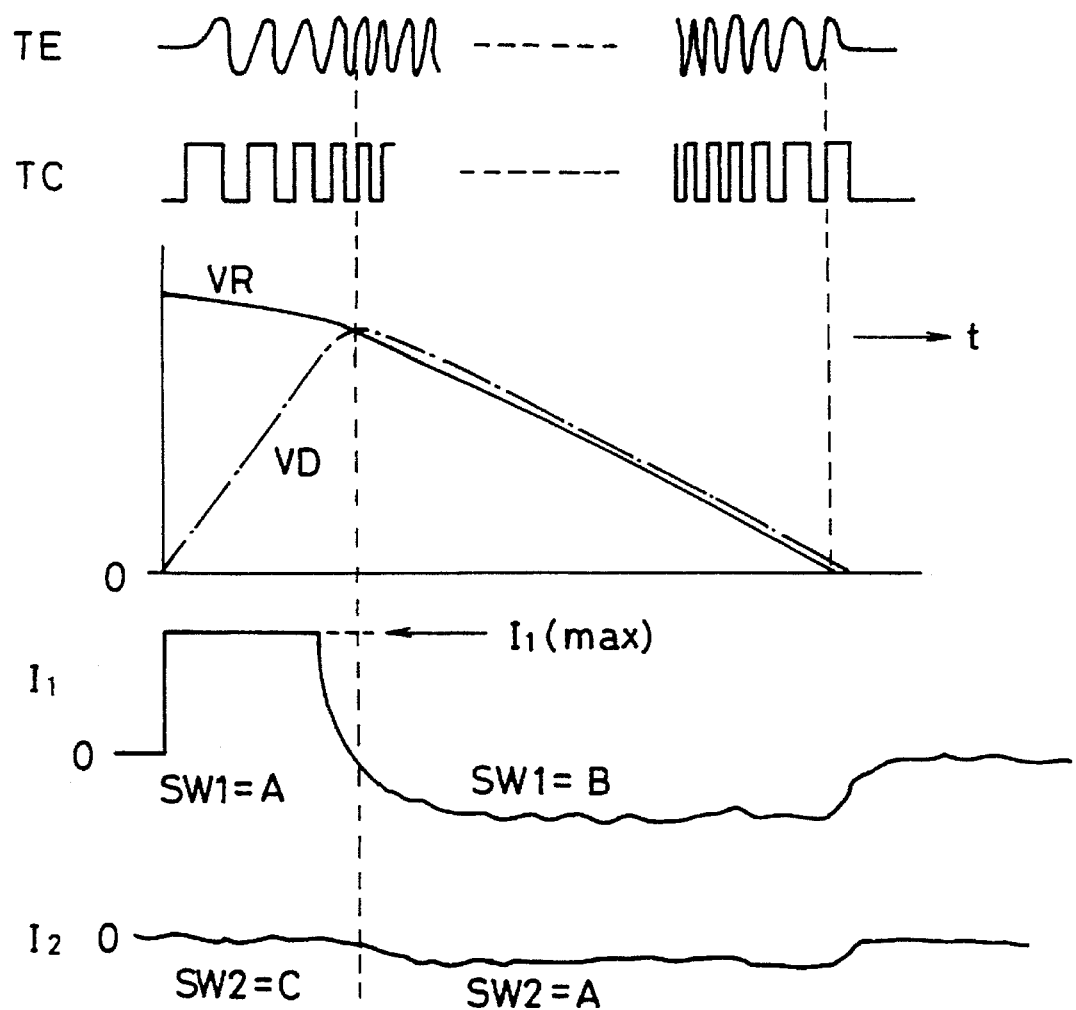
FIG. 3 is a view showing one example of a timing chart for explaining the operation of a control circuit 19 in the access controller of the present invention.

This relation is shown in a timing chart in FIG. 3.

FIG. 3 shows one example of the timing chart for explaining an operation of the control circuit 19 in the access controller of the present invention. In FIG. 3, reference numerals of signal waveforms respectively correspond to those shown in FIG. 1 and $I_1(max)$ shows a saturation value of an electric current $I_1$.

In a first operating state of the control circuit 19, the counting value of the counter 10 is set to an initial counting value N so that a reference speed VR is a large value as explained with reference to FIG. 2.

In this state, no light spot is moved yet so that a moving speed VD of the light spot is equal to zero.

As shown in FIG. 3, an output (VR−VD) of the subtracter 12 shows a large value and is amplified by the first power amplifier 20 through the gain compensator 13 and the first switch 17.

Accordingly, an output electric current $I_1$ of the first power amplifier 20, i.e., an electric current $I_1$ flowing through the seek motor 7 is equal to a saturation value $I_1(max)$.

This saturation value $I_1(max)$ is not proportional to the output (VR−VD) of the subtracter 12, but is a value determined from a power voltage supplied to a disk drive unit. In the access controller of the present invention, the saturation value $I_1(max)$ corresponds to a maximum acceleration which can be outputted by the seek motor 7.

As a result, the movement of the light spot can be accelerated at the maximum acceleration.

In the meanwhile, an output of the lens position sensor 4 is amplified by the second power amplifier 21 through the second compensator 16 about an output signal C and the second switch 18. An output current signal $I_2$ of the second power amplifier 21 is fed back to the actuator 6.

Therefore, the objective lens 2 is held in a reference position above the optical head 3. Namely, the objective lens 2 is held at a point at which an output voltage of the lens position sensor 4 is equal to zero.

It is very important to hold the objective lens 2 to prevent a shift in optical axis and harmful vibrations of a lens system since a position of the objective lens 2 is shifted from the reference position by inertial force caused by moving the optical head 3.

However, no holding operation of the objective lens 2 is necessarily required in a system in which no holding method of the objective lens 2 is easily influenced by the inertial force of the optical head 3. Further, no holding operation of the objective lens 2 is necessarily required in a system in which the objective lens 2 is fixed in a tracking direction and the light spot is slightly displaced by rotating a galvanomirror.

When the movement of the light spot is accelerated in FIG. 3, the moving speed VD of the light spot is gradually increased.

In contrast to this, the reference speed VR is gradually decreased as the counting value of the counter is decreased.

Accordingly, the difference (VR−VD) is sequentially reduced so that the output electric current $I_1$ of the first power amplifier 20 is gradually reduced from the saturation value. When this output electric current $I_1$ is reduced to a current value capable of amplifying this output electric current in proportion to the output (VR−VD) of the subtracter 12, the electric current $I_1$ is reduced from the saturation value $I_1(max)$ and is equal to zero when VR=VD.

The control circuit 19 changes the switching control signal SW1 of the first switch 17 and the switching control signal SW2 of the second switch 18 when the electric current $I_1$ is equal to zero.

Therefore, the first switch 17 is connected from the gain compensator 13 with respect to the output signal A to the first compensator 15 with respect to an output signal B. Namely, the first switch 17 is switched from side a to side b so that SW1 shows B.

Simultaneously, the second switch 18 is connected from the second compensator 16 with respect to the output signal C to the gain compensator 13 with respect to the output signal A as a lens moving signal. Namely, the second switch 18 is switched from side b to side a so that SW2 shows A.

In this case, the output signal B of the first compensator 15 outputted from the first switch 17 has negative polarity. An output of the electric current $I_1$ of the first power amplifier 20 having negative polarity means that an operating mode of the seek motor 7 is set to a decelerating mode for providing opposite driving force to the seek motor 7.

In this decelerating mode, the moving speed of the objective lens 2 is mainly controlled. The optical head 3 is moved by the seek motor 7 in accordance with the movement of the objective lens 2. In other words, the optical head 3 is moved by the seek motor 7 such that a displacing amount of the objective lens 2 is reduced.

Thereafter, the output signal A of the gain compensator 13 proportional to the output (VR−VD) of the subtracter 12 is amplified by the second power amplifier 21 through the second switch 18. An output electric current $I_2$ of the second power amplifier 21 is fed back to the actuator 6.

This electric current $I_2$ also has negative polarity while the input side of the second switch 18 is connected onto side a.

As mentioned above, in this first embodiment, the movement of the objective lens 2 can be accelerated at its maximum by the seek motor 7 at an accelerating time of the access controller. The moving speed of the objective lens 2 can be mainly controlled at a decelerating time of the access controller.

In general, precise speed control is required at the decelerating time of the access controller since the light spot must be finally stopped on a target track.

In this case, it is very suitable to use a control object having a small mass such as the objective lens when the width of a control region is increased to a higher band.

An access controller of a disk drive unit in accordance with a second embodiment of the present invention will next be described. This second embodiment corresponds to a sixth structure of the present invention.

In this second embodiment, more preferable effects can be obtained if the access controller is used in a system in which no holding method of an objective lens is easily influenced by inertial force of an optical head.

A first explanation relates to one example of the holding system of the objective lens which is not easily influenced by the inertial force of the optical head.

Figure 4:
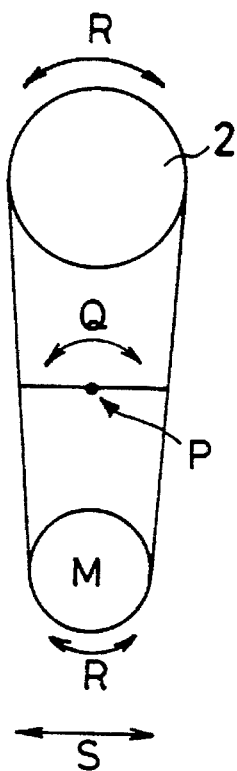
FIG. 4 is a view for explaining one example of a system for holding an objective lens in the disk drive unit.

FIG. 4 is a view for explaining one example of the holding system of the objective lens in the disk drive unit. In FIG. 4, reference numerals 2, M and P respectively designate an objective lens, a weight and a center of rotation. Reference numerals Q and R designate rotational directions of the objective lens 2. Reference numeral S designates a radial direction.

FIG. 4 shows a state in which this objective lens 2 is seen from a vertical direction of a disk 1.

Such a holding system of the objective lens is generally well known and called an axial sliding type system.

The objective lens 2 shown in FIG. 4 is constructed such that the objective lens 2 can be rotated around a certain axis. The weight M has a mass approximately equal to that of the objective lens 2 and is arranged on a side opposite to the objective lens 2 with respect to the center P of rotation.

Accordingly, if a center of gravity of the objective lens 2 and the weight M is in conformity with the center P of rotation and this center P of rotation is fixed to the optical head 3 shown in FIG. 1, no objective lens 2 is moved with respect to the optical head even when the optical head is moved in the radial direction S.

The above description relates to one example of the holding system of the objective lens which is not easily influenced by inertial force of the optical head as a premise in this second embodiment.

FIG. 5 is a functional block diagram showing the construction of a main portion of the access controller in the disk drive unit in the second embodiment of the present invention. In FIG. 5, the same constructional portions as FIG. 1 are designated by the same reference numerals as FIG. 1. In FIG. 5, reference numerals 31, 32, 33 and 34 respectively designate a low pass filter, a third compensator, a third switch and a control circuit. Reference numerals D and SW3 respectively designate an output signal of the third compensator 32 and a switching control signal of the third switch 33.

In this second embodiment, no lens position sensor 4 shown in FIG. 1 is disposed. The low pass filter 31 and the third compensator 32 are additionally disposed instead of the lens position sensor on the output side of a gain compensator 13 as a gain element.

A control operation of the control circuit 4 is a little different from that of the control circuit 19 in the first embodiment. Accordingly, the control circuits are designated by different reference numerals 34 and 19 to discriminate these control circuits from each other.

The control circuit 34 is operated as follows.

Similar to the first embodiment shown in FIG. 1, an initial counting value N is first loaded to a counter 10.

The input side of a first switch 17 is switched onto side a. Namely, the input side of the first switch 17 is connected to the gain compensator 13 with respect to an output signal A. The third switch 33 is turned off in an open state in which no signal SW3 is transmitted through the third switch 33.

Accordingly, in this state, a maximum electric current flows through the seek motor 7 so that an optical head 3 begins to be accelerated at a maximum acceleration.

In this case, no electric current is supplied to an actuator 6 and no objective lens 2 is moved with respect to the optical head 3 since the above holding system of the objective lens is used as explained in FIG. 4.

Similar to the first embodiment, a switching control signal SW1 of the first switch 17 and a switching control signal SW3 of the third switch 33 are changed when an electric current $I_1$ is equal to zero.

Namely, the first switch 17 is switched from side a to side b. Thus, the first switch 17 is connected by the switching control signal SW1 from the gain compensator 13 with respect to the output signal A to the third compensator 32 with respect to an output signal D. Accordingly, the switching control signal SW1 shows the output signal D.

Simultaneously, the third switch 33 is turned on in a short-circuited state in which the signal SW3 is transmitted through the third switch 33.

Accordingly, in this state, the output signal A of the gain compensator 13 proportional to an output (VR−VD) of a subtracter 12 is amplified by a first power amplifier 20 through the low pass filter 31 and the third compensator 32. An output electric current $I_1$ of the first power amplifier 20 is supplied to a seek motor 7 so that a moving speed of the objective lens 2 is mainly controlled.

Namely, a current value according to a low frequency region of the output signal A of the gain compensator 13 as a lens moving signal is transmitted to the seek motor 7.

Accordingly, when the objective lens 2 is moved, the seek motor 7 is also driven to reduce moving force of the objective lens. Thus, a light spot is moved while the objective lens 2 and the seek motor 7 are operated in cooperation with each other.

The low pass filter 31 will next be explained.

Figure 6:
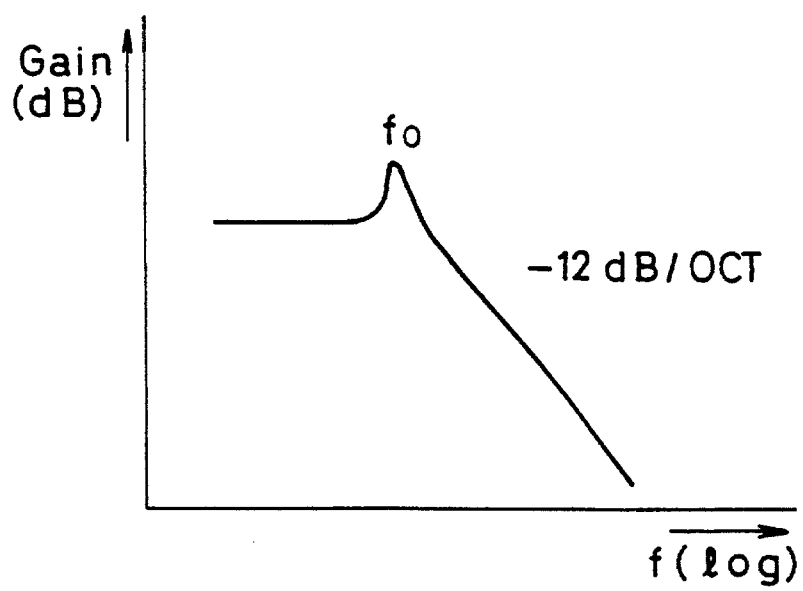
FIG. 6 is one example of a characteristic graph of a low pass filter suitably used for the access control method and device of the present invention.

FIG. 6 is one example of a characteristic graph of the low pass filter suitably used for the access control method and device of the present invention. In FIG. 6, axes of abscissa and ordinate respectively show frequency f and a gain. Reference numeral $f_0$ designates a primary resonance frequency of mechanical characteristics of the actuator 6.

As shown in FIG. 6, the frequency f is set to be equal to the primary resonance frequency $f_0$ of the mechanical characteristics of the actuator 6 and a secondary drop is set to be formed at a frequency equal to or higher than this primary resonance frequency $f_0$.

In general, a transfer function providing the actuator characteristics from a driving position of the actuator 6 to a position of the objective lens 2 is provided by a shape shown in FIG. 6.

Accordingly, it should be understood that an output signal of the low pass filter 31 corresponds to the position of the objective lens 2.

As a result, effects similar to those in the first embodiment shown in FIG. 1 can be obtained in accordance with the second embodiment shown in FIG. 5.

Further, it is not necessary to dispose the lens position sensor 4 shown in FIG. 1 so that cost of the access controller is reduced and the access controller is easily assembled.

As mentioned above, in accordance with a first structure of the present invention, the movement of a light spot can be accelerated with maximum ability at an accelerating time of the access controller so that an access time of the light spot can be reduced.

At a decelerating time of the access controller, a moving speed of the light spot can be precisely controlled in cooperation with coarse and precise driving means so that the light spot can be exactly positioned onto a target track.

In accordance with a second structure of the present invention, it is possible to realize an access controller for obtaining the above effects of the first structure of the present invention. Further, this access controller can be easily realized without using a complicated calculating means such as an up-down counter so that cost of the access controller can be reduced.

In accordance with a third structure of the present invention, the above effects of the second structure of the present invention can be obtained. Further, no harmful movement such as a shift in optical axis of a lens system is caused and the light spot can be accessed stably and exactly since an operation of the coarse driving means is held even when inertial force of an optical head is caused by acceleration of the coarse driving means.

In accordance with a fourth structure of the present invention, the movement of the light spot can be automatically accelerated with maximum ability without adding any special circuit, thereby simplifying the structure of the access controller.

In accordance with a fifth structure of the present invention, the above effects of the third and fourth structures of the present invention can be simultaneously obtained.

In accordance with a sixth structure of the present invention, it is not necessary to dispose a lens position sensor so that cost of the access controller can be reduced and the access controller can be easily assembled.

Many widely different embodiments of the present invention may be constructed without departing from the spirit and scope of the present invention. It should be understood that the present invention is not limited to the specific embodiments described in the specification, except as defined in the appended claims.

What is claimed is:

1. An access control device in which a light spot is formed on a disk, a track-crossing signal is detected from light reflected from the disk when said light spot crosses a track of the disk, and a track-crossing speed of said light spot is controlled by using the detected track-crossing signal to access the light spot in a radial direction of the disk, said access control device comprising:

a precise actuator for slightly displacing said light spot in the radial direction of the disk;

a coarse actuator for greatly displacing said light spot in the radial direction of the disk;

counting means for outputting an error in position of the light spot according to a difference between a present position of the light spot and a target position of the light spot by counting said track-crossing signal;

reference speed generating means for outputting a reference speed signal indicative of a reference speed monotonously reduced in accordance with a reduction of said error in position;

speed detecting means for outputting a relative speed signal indicative of a relative speed of movement between the light spot and the track determined in accordance with said track-crossing signal;

comparing means for outputting a speed error signal indicative of an error in speed determined according to a difference between said reference speed and the relative speed;

a first switching means controlled in such a manner that the speed error signal is transferred to the coarse actuator on a first mode and that a driving signal for displacing the coarse actuator in accordance with a displacing amount of the precise actuator is transferred to the coarse actuator on a second mode;

a second switching means controlled in such a manner that the speed error signal is not transferred to the precise actuator on the first mode and is transferred to the precise actuator on the second mode;

control means connected to the first switching means and the second switching means for controlling the track-crossing speed of the light spot at the first mode so as to make the error in speed small on starting an accessing operation and for switching from the first mode to the second mode when said speed error signal is smaller than a predetermined value;

a lens position sensor for generating a lens position signal in accordance with the displacing amount of the precise actuator and a driving signal generating means for generating the driving signal for displacing the coarse actuator in accordance with the lens position signal; and a lens hold signal generating means for generating a lens hold signal for holding the precise actuator at a reference position in accordance with the lens position signal, and wherein said second switching means transfers the lens hold signal to the precise actuator on the first mode and transfers the speed error signal to the precise actuator on the second mode.

2. An access control device according to claim 1, which further comprises means for generating the driving signal for displacing the coarse actuator in accordance with the displacing amount of the precise actuator by extracting a low frequency region component of the speed error signal.

* * * * *